(12) United States Patent
Kokins et al.

(10) Patent No.: US 11,801,441 B2
(45) Date of Patent: Oct. 31, 2023

(54) SERVER-SIDE GAMING METHOD AND SYSTEM FOR THE DELIVERY OF REMOTELY-RENDERED CONTENT COMPRISING IMPRESSION CONTENT

(71) Applicant: Bidstack Group PLC, London (GB)

(72) Inventors: Arvids Kokins, London (GB);
Francesco Petruzzelli, London (GB)

(73) Assignee: BIDSTACK GROUP PLC, London (GB)

( * ) Notice: Subject to any disclaimer, the term of this patent is extended or adjusted under 35 U.S.C. 154(b) by 0 days.

(21) Appl. No.: 17/697,677

(22) Filed: Mar. 17, 2022

(65) Prior Publication Data

US 2023/0293985 A1 Sep. 21, 2023

(51) Int. Cl.
*A63F 13/352* (2014.01)
*A63F 13/61* (2014.01)
(Continued)

(52) U.S. Cl.
CPC .......... *A63F 13/352* (2014.09); *A63F 13/358* (2014.09); *A63F 13/44* (2014.09);
(Continued)

(58) Field of Classification Search
CPC ...... A63F 13/352; A63F 13/358; A63F 13/44; A63F 13/61; A63F 2300/534;
(Continued)

(56) References Cited

U.S. PATENT DOCUMENTS

| 10,953,318 B2* | 3/2021 | Atli ..................... A63F 13/35 |
| 2006/0080702 A1* | 4/2006 | Diez ..................... A63F 13/71 725/31 |

(Continued)

FOREIGN PATENT DOCUMENTS

KR    20190065181 A    6/2019

OTHER PUBLICATIONS

International Search Report and Written Opinion dated Jun. 20, 2023 for PCT Application No. PCT/GB2023/050608.

*Primary Examiner* — William H McCulloch, Jr.
*Assistant Examiner* — Ankit B Doshi
(74) *Attorney, Agent, or Firm* — EIP US LLP

(57) ABSTRACT

A server-side gaming method performed by a framework for delivering remotely-rendered content. The framework comprises a provisioning server for generating impression content, a remote server for generating frames of the remotely-rendered content comprising gaming content and the impression content; and an API for sending and receiving. The method comprises requesting from the provisioning server, a media asset associated with the impression content; and storing the media asset in storage of the remote server. On receipt of a request from the first user device, generating, a first instance of remotely-rendered content, where the impression content comprises the stored media asset. On receipt of a request from the second user device. generating a second, different, instance of remotely-rendered content, where the impression content comprises the stored media asset. Transmitting, to the first user device, the first instance and transmitting to the second user device, the second instance.

13 Claims, 6 Drawing Sheets

(51) Int. Cl.
*A63F 13/358* (2014.01)
*A63F 13/44* (2014.01)

(52) U.S. Cl.
CPC ........ *A63F 13/61* (2014.09); *A63F 2300/534* (2013.01); *A63F 2300/538* (2013.01); *A63F 2300/552* (2013.01); *A63F 2300/5506* (2013.01); *A63F 2300/636* (2013.01)

(58) Field of Classification Search
CPC ........ A63F 2300/538; A63F 2300/5506; A63F 2300/552; A63F 2300/636
See application file for complete search history.

(56) References Cited

U.S. PATENT DOCUMENTS

| | | |
|---|---|---|
| 2010/0030640 A1 | 2/2010 | Van Datta et al. |
| 2010/0274872 A1 | 10/2010 | Harrang et al. |
| 2012/0079080 A1* | 3/2012 | Pishevar ................. A63F 13/26 709/220 |
| 2021/0031105 A1* | 2/2021 | Ganschow ............ G06F 3/0482 |
| 2021/0387094 A1* | 12/2021 | Young ..................... A63F 13/87 |
| 2023/0128243 A1* | 4/2023 | Sundareson ............ A63F 13/85 709/231 |

* cited by examiner

SERVER-SIDE GAMING METHOD AND SYSTEM FOR THE DELIVERY OF REMOTELY-RENDERED CONTENT COMPRISING IMPRESSION CONTENT

BACKGROUND OF THE INVENTION

Field of the Invention

The present disclosure relates to server-side gaming methods and systems relating to the delivery of remotely-rendered content to user devices. The disclosure has particular, but not exclusive, relevance to remotely-rendered content comprising impression content.

Description of the Related Technology

The popularity of video games has risen meteorically, and currently the global video game industry is worth more than the music and film industries combined. In the early years of gaming, video game developers and associated entities made money through the sale of video games on physical media (laserdiscs and cartridges). Nowadays, video games are more often downloaded or even streamed onto a connected gaming device such as a personal computer, games console or smartphone. Whilst this model still allows commercial entities to make money from the sale of video games, it is common for further revenue streams to be pursued based on the sale of advertising space, including advertising space within the video games themselves. In the context of video games, adverts may be presented to a user as part of a loading screen or menu, or alternatively may be rendered within a computer-generated environment during gameplay, leading to the notion of in-game advertising. For example, in a sports game, advertising boards within a stadium may present adverts for real-life products. In an adventure game or first-person shooting game, adverts for real-life products may appear on billboards or other objects within the game environment.

Revenue models based on the sale of advertising space are ubiquitous in the context of film and television, as well as for websites and social media applications. Advertisers are typically charged in dependence on the expected or actual reach of a given advert, or in other words the expected or actual number of "impressions" of the advert experienced by consumers hence the term impression content. For television and film, an advertising fee may be negotiated in dependence on several showings of the advert and a predicted audience size for each showing. For a website or social media application, the advertising fee may be related to several page views or clicks. The distribution of an advert may then be controlled in dependence on these factors.

In the above cases, it is technically straightforward to predict and measure the number of advertising impressions experienced by users. For video games, the situation is different. Because different players will experience a given video game differently depending on actions taken by the players and/or random factors within the video game code, it is not generally possible to predict the extent to which a given advert within a video game will be viewed, and therefore the number of impressions experienced by the player. For the advertising revenue model to be applied to in-game advertising, the visibility of an advert may therefore be measured in real-time as a video game is played.

Tracking both the receipt of the advertisement at individual user devices and monitoring whether the advertisement is viewed by the user during gameplay is a complex and computationally expensive process.

SUMMARY

In accordance with a first aspect, there is provided a server-side gaming method performed by a framework for delivering remotely-rendered content comprising impression content to at least a first user device and a second user device, the framework comprising: a provisioning server arranged to generate and manage the impression content; a remote server arranged to generate a plurality of frames of the remotely-rendered content, wherein the plurality of frames of remotely-rendered content comprises gaming content and the impression content; and an application programming interface, API, for sending and receiving data between the first and second user devices and the remote server. The method comprising requesting, by the remote server and from the provisioning server, at least one media asset associated with the impression content; storing the at least one media asset associated with the impression content in storage associated with the remote server; on receipt of a request from the first user device to the remote server using the API, generating, at the remote server, a first instance of remotely-rendered content, wherein the impression content of the first instance of remotely rendered gaming content comprises the at least one media asset stored in the storage associated with the remote server; on receipt of a request from the second user device to the remote server using the API, generating at the remote server, a second, different, instance of remotely-rendered content, wherein the impression content of the second instance of remotely-rendered content comprises the at least one media asset stored in the storage associated with the remote server; and transmitting, to the first user device, the first instance of remotely-rendered content and transmitting to the second user device, the second instance of the remotely-rendered content.

This enables the provision of media assets associated with the impression content, such as images, text, video, and audio, to the remote server such that when the remotely rendered gaming content is generated, the media assets are stored locally, thereby reducing bandwidth and processing at the provisioning server. As there is no requirement to request and download the media assets from the provisioning server during the actual generation of the remotely rendered content efficiency is increased since the same media assets can be reused whilst generating content for multiple user devices and accessed quicker since the connection between the storage associated with the remote server is faster than the connection between the provisioning server and the remote server.

The request, sent by the remote server to the provisioning server, for at least one media asset associated with the impression content may be based on an active period associated with the impression content. This allows the media asset to be prefetched based on when the impression content will be active.

The active period associated with the impression content may be based on a time period during which the impression content is transmitted from the provisioning server to the remote server for generating the remotely-rendered content. This allows impression content to be delivered during a given time period, and therefore assets associated with that impression content can be provided to the remote server in advance.

Furthermore, the at least one media asset associated with the impression content may be based on one or more predetermined filters. These filters may include characteristics of the first user device or second user device arranged to receive the remotely-rendered content; a rating associated with the remotely-rendered content; and an initialisation date associated with the impression content. The characteristics of the first user device and second user device comprise at least an operating system; hardware characteristics; an internet protocol or other unique identifier; and a geographical location. This enables the provision of the media assets to the storage of the remote server to be limited based on a number of filters such as age rating, platform, IP Address, and geographical location. This ensures that only the relevant media assets are downloaded to the remote server based on the remotely-rendered content that remote server is generating.

The at least one media asset associated with the impression content may be based on similarity to impression content previously transmitted to at least one of the first user device or the second user device. This enables the provision of the media assets to the storage of the remote server to be based on their similarity to previous impression content delivery to the user device.

The framework may comprise a plurality of provisioning servers, and wherein the request for at least one media asset associated with the impression content is sent by the remote server to at least one of the plurality of provisioning servers, wherein the at least one provisioning server is selected based on a proximity of the at least one provisioning server to the remote server. The proximity of the at least one provisioning server to the remote server is based on at least one of a geographical location of the at least one provisioning server; a geographical location of the remote server; and a response time of a transmission between the remote server and the at least one provisioning server. This enables a provisioning server to be selected based on the proximity to the remote server. For example, if the remote server is in a given data center, then the provisioning server may be a provisioning server from the same or adjacent data center, or another nearby data center. This ensures that the assets downloaded are obtained from nearby provisioning servers, thereby having a positive impact on the speed and latency when downloading media assets for use in generating the remotely-rendered content at the remote server.

According to a second aspect, there is provided a system for delivering remotely-rendered content comprising impression content to at least a first user device and a second user device, the system comprising a provisioning server arranged to generate and manage impression content; a remote server arranged to generate a plurality of frames of remotely-rendered content, wherein the plurality of frames of remotely rendered gaming content comprises gaming content and the impression content; a first user device arranged to receive the remotely-rendered content; a second user device arranged to receive the remotely-rendered content; and an application programming interface, API, for sending and receiving data between the first and second user devices and the remote server. The remote server comprises a request module for requesting, by the remote server and from the provisioning server, at least one media asset associated with the impression content; storage for storing the at least one media asset associated with the impression content in storage associated with the remote server; a generation module for generating at least: a first instance of remotely-rendered content, wherein the impression content of the first instance of the remotely rendered gaming content comprises the at least one media asset stored in the storage associated with the remote server on receipt of a request from the first user device to the remote server using the API; and a second, different, instance of remotely-rendered content, wherein the impression content of the second instance of the remotely-rendered content comprises the at least one media asset stored in the storage associated with the remote server on receipt of a request from the second user device to the remote server using the API; and a transmission module for transmitting, to the first user device, the first instance of remotely-rendered content, and transmitting, to the second user device, the second instance of the remotely-rendered content.

According to a third aspect, there is provided a non-transient storage medium comprising computer-readable instructions which, when executed by a computing system, cause the computing system to perform the method described above.

Further features and advantages of the invention will become apparent from the following description of preferred embodiments of the invention given by way of example only, which is made with reference to the accompanying drawings.

DETAILED DESCRIPTION OF CERTAIN INVENTIVE EMBODIMENTS

Figure 1:
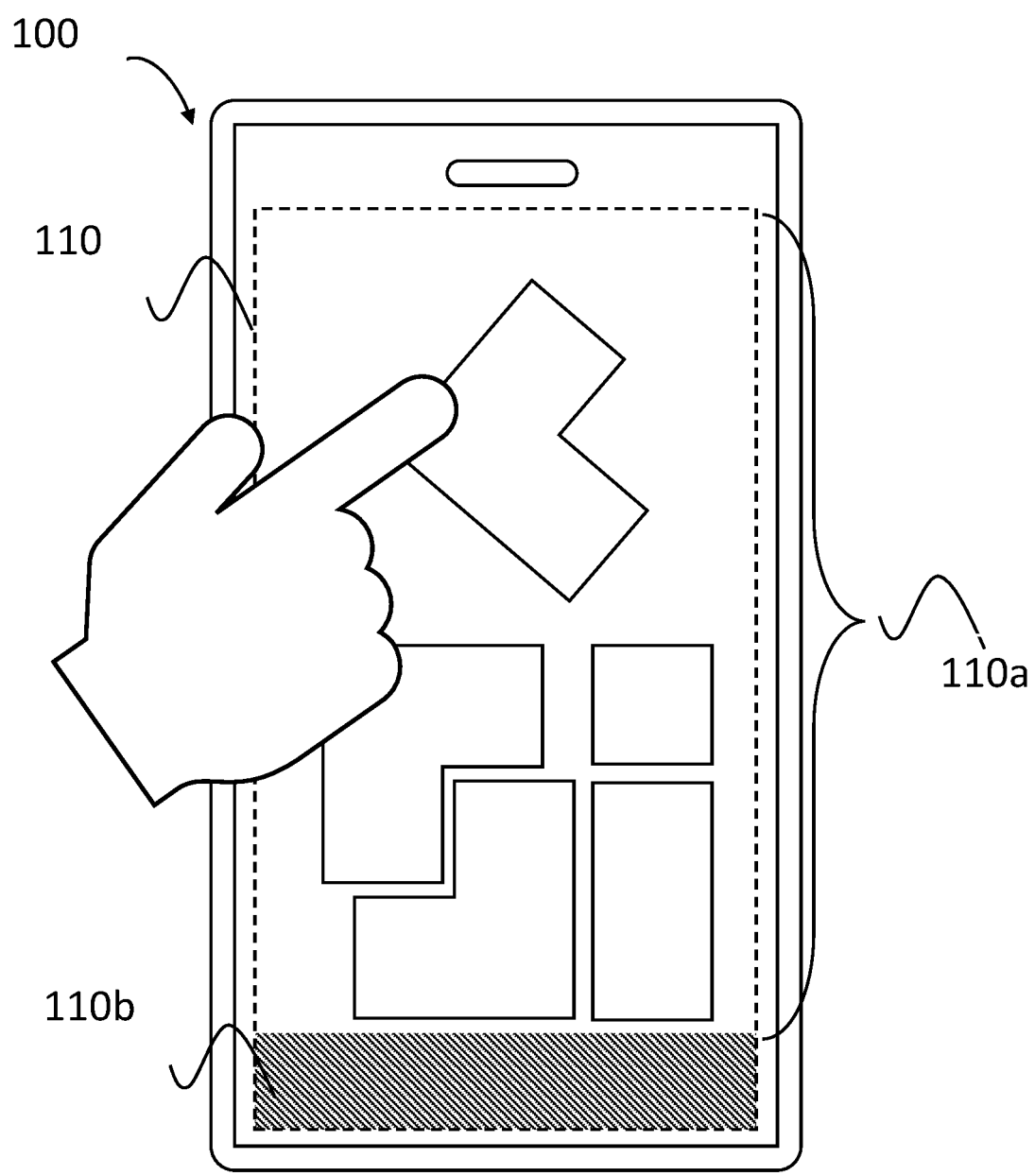
FIG. 1 shows, schematically, a user device for receiving gaming content according to an example.

Details of methods and systems according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to monitoring and verifying the receipt of remotely-rendered content at a user device. The remotely-rendered content comprises gaming content and impression content, which is content, such as an advertisement, for which an advertiser would be charged depending on the expected or actual reach of a given advert in accordance with an advertising revenue model. In other words, the expected or actual number of "impressions" of the advert experienced by users on their devices. The remotely-rendered content may be rendered on a server, such as in a cloud computing environment, where each instance of the game (e.g., a game requested and accessed by a user via their user device) is operating in its own isolated network segment, such as a virtual machine.

Cloud computing is a model for service delivery enabling on-demand network access to shared resources including processing power, memory, storage, applications, virtual machines, and services, that can be instantiated and released with minimal effort and/or interaction with the provider of the service. Cloud computing environments enable quick and cost-effective expansion and contraction of such resources by enabling the provisioning of computing capabilities, such as server time and network storage as needed. Cloud computing enables the service provider's resources to be pooled and to serve multiple consumers by dynamically assigning and reassigning physical and virtual resources on demand. Examples of such services include Amazon Web Services™ (AWS), Microsoft Azure, and Google Cloud Platform.

Services delivered using a cloud computing environment are often referred to as Software as a Service (SaaS). The applications are accessed from various user devices through a basic interface, such as a web browser or other software program. A user of the application generally has no control or knowledge over where the provided resources are located or in some examples where multiple service providers are used, which service provider is providing the resources; access to the resources of the cloud computing environments is provided via a user account object which facilitates the user's interaction with the resources allocated to a given task within the cloud computing environment. Whilst a cloud computing environment is one of the configurations capable of generating/providing the remotely-rendered content, it will be appreciated that other environments may be used, such as a collection of servers within a local area network (LAN).

FIG. 1 shows, schematically, a user device 100 according to a first example. The user device 100 shown is a mobile telephone with a touch screen interface, however, it will be appreciated that the user device 100 may be a hand-held or laptop device, a desktop computer, a multiprocessor system, a microprocessor-based system, or a programmable consumer electronic device comprising appropriate transmitting and/or receiving capabilities. The user device 100 is arranged to receive remotely-rendered content 110 for presentation to a user via a display associated with the user device 100. The remotely-rendered content 110 is received from a remote server (not shown) which is responsible for generating the remotely-rendered content 110. The remotely-rendered content 110 comprises gaming content 110a and impression content 110b received from a provisioning server (not shown). When generating the remotely-rendered content 110 the impression content 110b and gaming content 110a may be combined such that the impression content 110b appears to be part of the gaming content 110a, for example appearing on an advertising board shown in a three-dimensional environment represented in the gaming content 110a, which is tracked within the gaming content 110a, as the user's playable character moves around the three-dimensional environment. Further details regarding the interaction between the remote server, provisioning server, and user device will be described below with reference to FIG. 2.

The gaming content 110a is content representing a game running on the remote server which is accessed by the user device 110. This gaming content 110a can be generated in an isolated network segment running on the remote server and operating in a cloud computing environment. The impression content 110b may be an advertisement provided by a third-party advertising partner who has an advertising campaign configured to be presented with the game generated at the remote server. The advertising campaign may be configured to enable the impression content 110b to be presented in multiple different games and can be targeted to specific and/or groups of games based on several different factors. The management of the advertising campaign and other features of the impression content 110b may be handled by the provisioning server and transmitted to the remote server on request as will be described with reference to FIG. 2 and FIG. 3, below. Such features may include an advertising revenue model associated with the impression content.

In some examples, the user device 110 is also responsible for the transmission of data back to the remote server indicating receipt of at least the impression content 110b, as well as other data such as whether the impression content 110b was viewed by the user on the display of the user device 110.

To facilitate the transmission and/or receiving capabilities, the user device 110 may comprise a network adaptor that is arranged to facilitate communication with any number of remote resources, such as the remote server, via a network such as a local area network (LAN), a general wide area network (WAN), and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of user device 110 and transmitting and/or receiving capabilities may be used.

Figure 2:
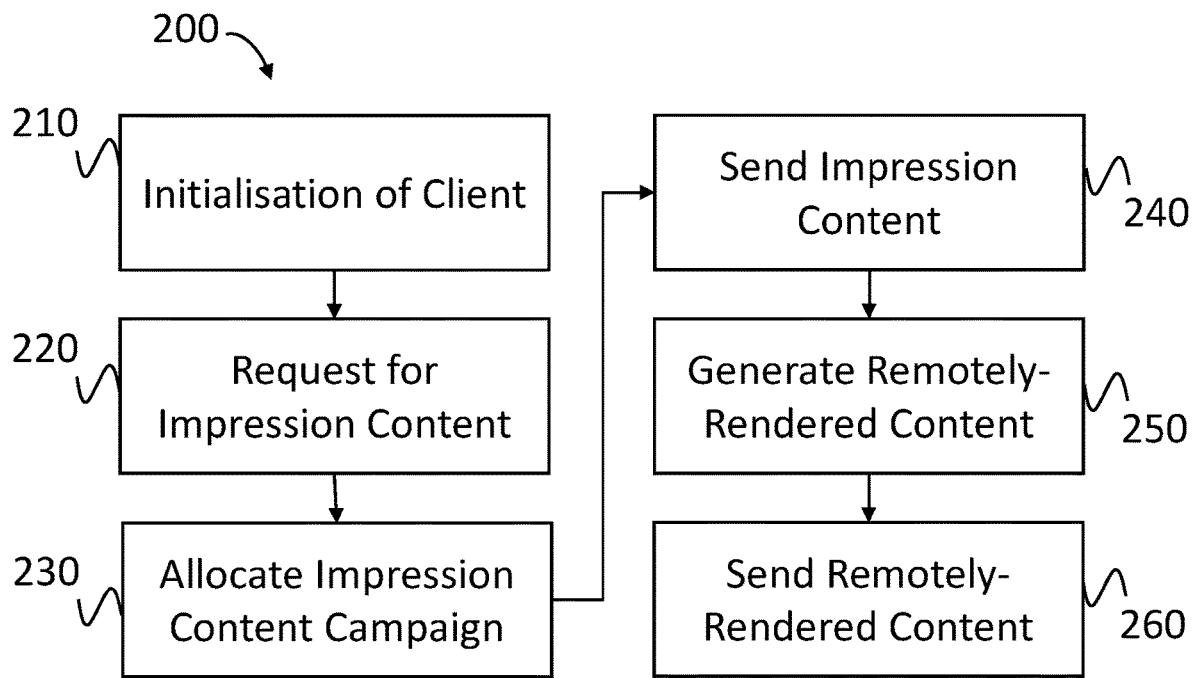
FIG. 2 shows a flowchart for a method of requesting impression content according to an example.
Figure 3:
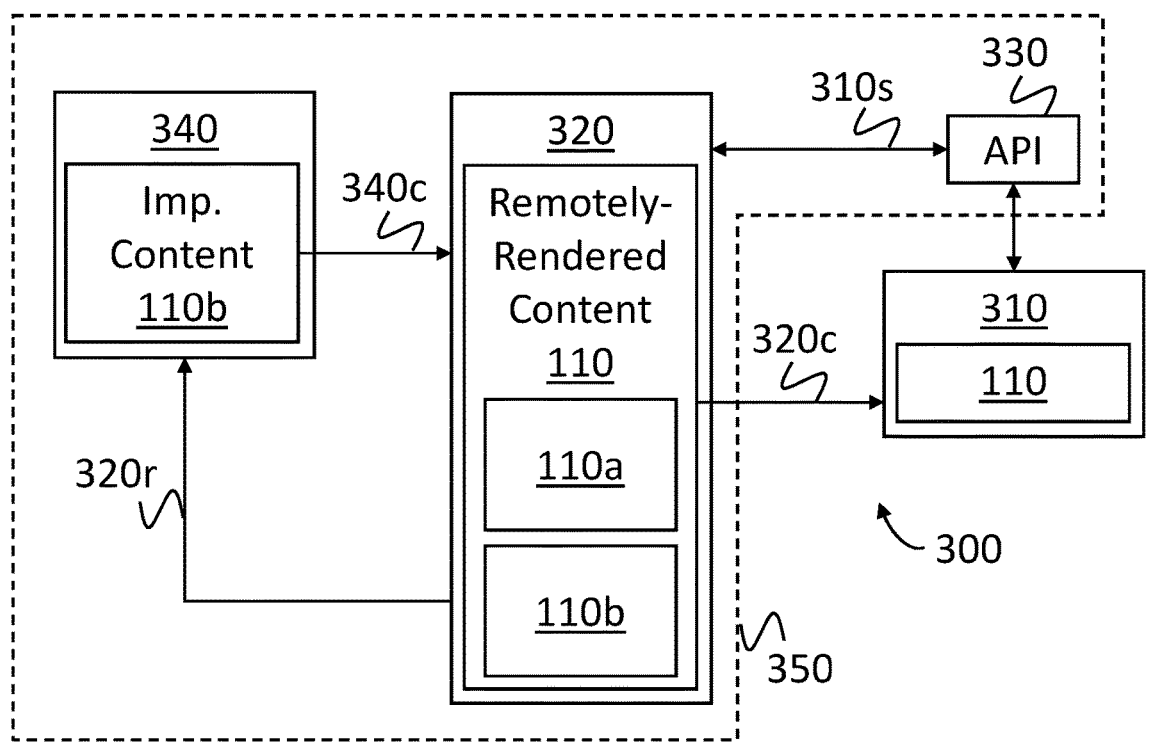
FIG. 3 is a schematic representation of a system according to an example.

FIG. 2 is a flowchart 200 showing a method for requesting impression content and generating the remotely-rendered content for display on a user device, such as user device 100 described above with reference to FIG. 1. Furthermore, FIG. 3 is an exemplary system 300 for implementing the method described in FIG. 2. A user of the user device 310 may provide an input to the user device 310 via a user interface that launches an application or other software program, such as a web browser arranged to communicate with a remote server that is responsible for generating remotely-rendered content, such as a game. At step 210, the remote server starts a session with the user device 310, as indicated by arrow 310s, which may retrieve information associated with the user device 310, including, but not limited to:

the operating system type and version of the user device;
the user device make and model;
details regarding the hardware components of the user device, such as the processor type (e.g. 32-bit/64-bit); and
details regarding other software and applications installed on the user device, such as antivirus software.

This information may be transmitted to the remote server 320 that is arranged to generate the remotely-rendered content via a network connection, as described above. Information may be provided to the remote server 320 via an application programming interface, API 330. The API 330 is configured to facilitate the communication between the user device 310 and the remote server 320, such that information can be passed from the user device 310 to the remote server 320 and vice versa. It is also determined whether the application/software program is to receive remotely-rendered content via a cloud environment—such as one operating on the remote server 320. If so, the user device 310, communicates with the remote server 320 via the API 330.

At step 220, a request may be sent from the remote server 320 to a provisioning server 340 as indicated by arrow 320r. The provisioning server 340 is responsible for the generation and management of the impression content, such as advertisements, and campaigns associated with the impression content. As part of the request 320r from the remote server 320, targeting information associated with the user device 310, and the user of the user device 310 may be passed to the provisioning server 340, to enable a suitable campaign to be selected. Such data may include:
- the age of the user;
- the gender of the user;
- other personally identifiable information and/or characteristics;
- a unique user identifier;
- a location of the user based on a location submitted or a current location based on a global positioning system signal received at the user device; and
- user consent to data processing.

Once the request for the impression content has been received, at step 230, an appropriate campaign can be selected. The campaign may comprise different impression content, which is relevant based on the targeting information provided. For example, where location data is provided, this may be utilized by the provisioning server 340 to select a suitable campaign for that location, such that the user is shown impression content suitable for their current location. This ensures the impression content is more relevant.

In some examples, there may not be a relevant campaign to allocate, and in such a case a request may be sent to a third-party partner to determine whether they would like to provide impression content based on the targeting information associated with the user and user device 310. In other examples, there may be generic campaigns that are relevant to large groups of user and user devices, and where there are no available campaigns based on the targeting information, and no third-party partners provide a suitable campaign based on the targeting information, the generic campaign may be selected.

Based on the allocated campaign, at step 240, impression content 110b can be selected and sent to the remote server 320 from the provisioning server 340 as indicated by arrow 340c. The impression content 110b sent may comprise media assets such as image, video, text, hyperlinks, each being associated with the allocated campaign. In some examples, the provisioning server 340 may modify media assets and/or select preconfigured media assets based on several characteristics, such as the user device information, as described with reference to step 210, and/or other information such as the type of application/software program operating in the cloud environment. It will be appreciated that user device information may be gathered at other times and used to modify and/or select relevant media assets, for example when the user device is rotated the orientation of the user device will change and may be communicated to the provisioning server 340 so as to enable the selection and/or modification of media assets. Such modifications may include upscaling and downscaling the assets, adjusting padding at the edges of the assets, adjusting hyperlinks to relevant application provisioning services based on the user device (e.g., the relevant App Store on iOS® or Android™). In some examples, preconfigured media assets, such as representations of the media assets with different resolutions may be stored at the provisioning server 340 and selected based on the user device information. In yet further examples, as described below with reference to FIGS. 8 and 9, the media assets associated with the impression content may have been prefetched and stored in storage associated with the remote server 320.

Upon receipt of the impression content 110b at the remote server 320, the remote server generates the remotely-rendered content 110 which comprises the gaming content 110a and the impression content 110b, at step 250. The combination of the game content 110a and the impression content 110b can be dependent on several factors. For example, if the game content 110a is a simple two-dimensional fixed view game, then, as shown in FIG. 1, there may be a fixed location for the impression content 110b. Alternatively, where the game content 110a is a more complex three-dimensional game in which a user can explore a three-dimensional computer-generated environment, the impression content 110b may be associated with a given location and/or object within the three-dimensional environment. Furthermore, there may be multiple locations and/or objects within the gaming environment (whether two-dimensional or three-dimensional) associated with impression content 110b. In such examples, the impression content 110b may differ depending on the location and/or associated object in the environment, and in some examples, different campaigns may be associated with different locations and/or objects. In yet further examples, the location of the impression content 110b within the gaming content 110a may be determined dynamically, based on a given target within the gaming content 110a, such as moving object, but also may be associated with a user's current location within a three-dimensional gaming environment, and/or by following a virtual camera within the three-dimensional gaming environment. In yet other examples, the location of the impression content 110b within the gaming content 110a, can be randomized.

Once the remotely-rendered 110 content has been generated, at step 260, it is sent to the user device 310 for display, as indicated by arrow 320c. In certain environments, such as the three-dimensional gaming environments mentioned above, the user will view the remotely-rendered content 110 via a virtual camera within that environment. As such, there will be instances where the impression content 110b is not visible on the viewable area of the display (e.g., it may be behind the virtual camera) of the user device 310. Therefore, in some examples, the user device 310 may record viewability data associated with the impression content 110b (or each instance of the impression content). This data may be sent back to the remote server 320 and/or provisioning server 340 for analysis to refine and/or improve campaigns and impression content 110b locations. The remote server 320, API 330, and provisioning server 340 collectively may be referred to as a framework 350.

Since the impression content 110b is generated at the provisioning server 340, and then combined with the gaming content at the remote server 320, the provisioning server 340 has no way of confirming whether the impression content 110b was successfully received at the user device 310 and viewed by the user. Systems and methods for addressing this will be described in further detail below with reference to FIGS. 4-9.

Confirming Receipt of Impression Content

A remote server, such as remote server 320, is responsible for generating the user consumable content, such as the plurality of frames of remotely-rendered content referred to above, where this remotely-rendered content comprises at least one instance of the impression content generated and managed by the provisioning server. As such, the remote server is configured to provide remotely-rendered content to at least one user device, and in some examples, simultaneously and in parallel to a plurality of user devices. The remote server may operate in a cloud computing environment that comprises a plurality of isolated network segments, such as virtual machines, which enables the remote server to handle a plurality of requests for different, or the same, remotely-rendered content. As will be appreciated from the foregoing, the provisioning server, such as the provisioning server 340, is responsible for generating and managing the impression content, including recording the allocations of any benefits to the authors of the impression content in accordance with an advertising revenue model, such as when a user views an advertisement within a game. It can be useful for a provisioning server to confirm receipt of the impression content at a user device (along with, in some examples, confirming other information), for example to ensure the correct calculation and/or adjustment of the appropriate metrics.

Figure 4:
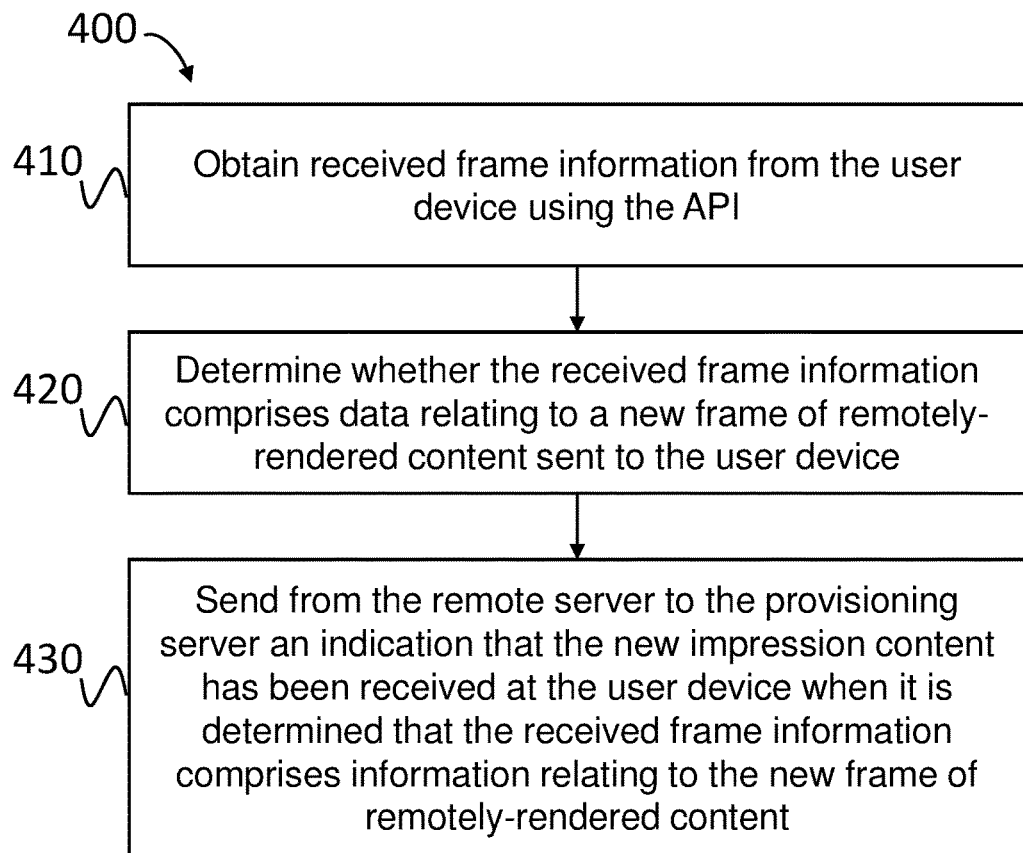
FIG. 4 shows a flowchart for a method of confirming the receipt of impression content at a user device according to an example.
Figure 5:
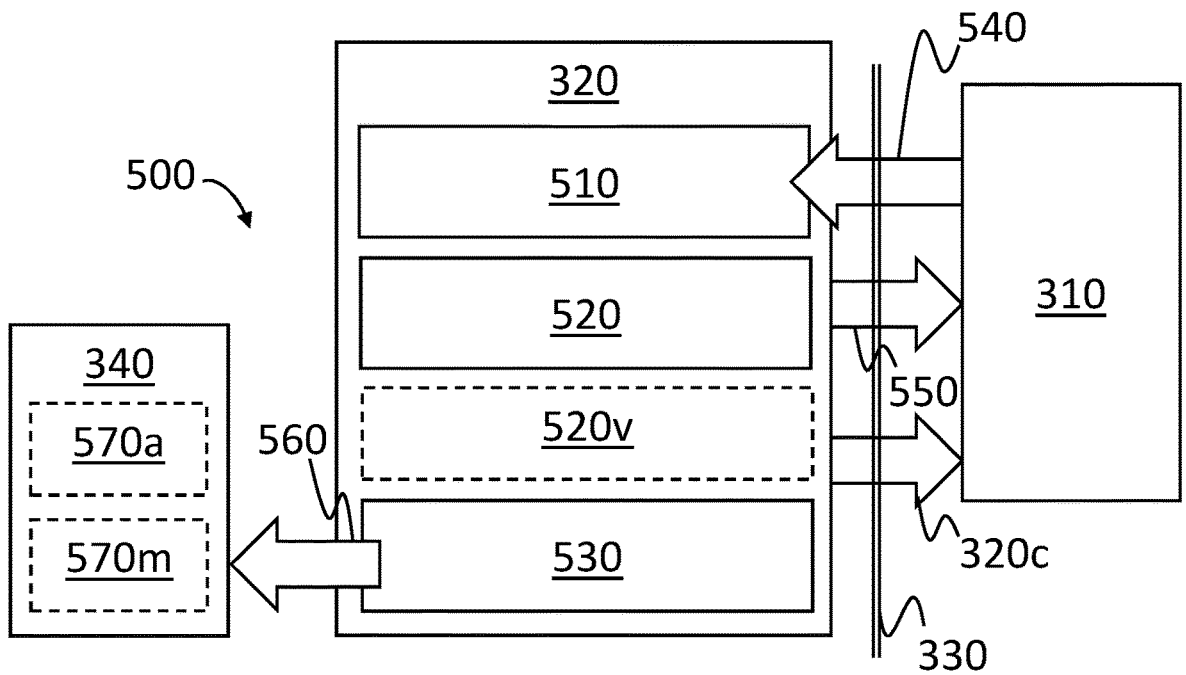
FIG. 5 is a schematic representation of a system for performing the method of FIG. 4.

A user device, such as user device 310, may request the remotely-rendered content from the remote server via an API, such as API 330 described above. In some embodiments, the stability and quality of the network connection between the user device and the remote server cannot be guaranteed. As such, and as explained above, there is no guarantee that the impression content provided by the provisioning server to the remote server will be received at the user device. FIG. 4 shows a flowchart 400 of a method of confirming receipt of the impression content at the user device 310 according to an example, and FIG. 5 shows a corresponding system 500.

As described above, the remote server 320 is responsible for generating a plurality of frames of remotely-rendered content which are then transmitted 320c to the user device 310. Each frame of remotely-rendered content may have a unique identifier, which can be indicated in the received frame information 540 sent by the user device 310 to the remote server 320 on receipt of the request 550.

At step 410, received frame information 540 from a user device 310 is obtained using the API 330. The received frame information may be received via a network adapter associated with an input module 510 of the remote server 320. For example, the remote server 320, may send a request 550 through the API 330, to the user device 310, to determine which frames of the remotely-rendered content have been received by the user device 310. In some examples a separate request 550 may not be required. For example, a bidirectional packet stream may be utilized such that the user device periodically sends data to the remote server, and the remote server periodically sends frames of the remotely-rendered content 110 to the user device. It will be appreciated that other methods of transmitting data, requests and frames of the remotely-rendered content 110 between the remote server 320 and user device 310; and for identifying which frames of remotely-rendered content have been received by the user device 310, may be used. This received frame information 540 may be stored in storage (not shown) of the user device 310, such that when a request 550 is received, the received frame information 540 transmitted to the remote server 320 may represent the receipt of a plurality of frames of remotely-rendered content. The received frame information 540 may comprise the most recent identifier which can then be used to indicate the receipt of a frame of remotely-rendered content with said identifier.

As also described above, in some examples, the remotely-rendered content is generated in an isolated network segment of a cloud computing environment, such as a virtual machine. In such examples, multiple user devices may receive the remotely-rendered content, such as in a multi-player game. As such, the received frame information 540 obtained by the input module 510 at step 410 may be obtained from each of the user devices that has received the remotely-rendered content.

Upon receipt of the received frame information 540 by the input module 510 of the remote server 320, at step 420, it is determined whether the received frame information 540 comprises data relating to a new frame of remotely-rendered content sent to the user device 310. This determination may be performed by a determination module 520 of the remote server. As described above, frames of remotely-rendered content are transmitted 320c to the user device 310 by the remote server 320, and information associated with that frame such as a unique identifier is retained at the remote server 320. Determining whether the received frame information 540 comprises data relating to a new frame of remotely-rendered content that has been sent to the user device 310 may comprise comparing the information regarding frames transmitted to the user device 310 and the identifying information of the frames in the received frame information 540. The result of this comparison can be used to indicate whether any new frames of remotely-rendered content comprises new gaming content and new impression content that has been generated and transmitted since a previous check. If a new frame of remotely-rendered content has been successfully received at the user device 310 the received frame information 540 sent from the user device will comprise an identifier associated with the new frame for remotely-rendered content.

Following the determination, at step 430 an indication 560 is sent to the provisioning server. The indication 560 may be sent by a transmission module 530 of the remote server 320. This indication 560 may be sent when it is determined that the received frame information 540 comprises information associated with the new frame. Transmitting the indication 560 to the provisioning server 340 ensures that the provisioning server 340 is aware that the impression content 110b has been received by a user device 310. The indication 560 transmitted from the remote server 320 to the provisioning server 340 may comprise several different pieces of information, and in particular comprises data indicating that the new impression content, which forms part of the new frame of remotely-rendered content, has been received at the user device 310.

In some examples, the indication 560 may comprise other information such as performance data associated with the impression content. The performance data may comprise information such as user interaction with the impression content, and be sent from the remote server 320 to the provisioning server 340 to enable the provisioning server to adjust and/or alter the impression content based on user metrics and to improve or facilitate further user interaction. The performance data may be analyzed by an analysis module 570a of the provisioning server, which is responsible for determining what, if any, alterations to make to the impression content. Based on this analysis, a modification module 570m of the provisioning server may modify and/or select the impression content, which will then be transmitted to the remote server 320 for use when generating new frames of remotely-rendered content.

When the remotely-rendered content is transmitted to a plurality of user devices, the indication 560 transmitted from the remote server 320 to the provisioning server 340 may comprise at least data representative of the receipt of the new impression content at a first of the plurality of user device and a second of the plurality of user devices. That is, the indication may combine data associated with a plurality of user devices and transmit this summarized data to the provisioning server 340. The summarized data may also comprise other data for one or more user devices 310, such as viewability characteristics as described below.

The transmission of the indication 560 to the provisioning server 340 may occur periodically, for example at predetermined time periods, or at a given time or times every day. In other examples, the transmission of the indication 560 may be based on factors associated with the transmission 320c of the remotely-rendered content to the user device 310. One such example, as will be described in greater detail below includes transmitting the indication 560 from the remote server 320 to the provisioning server 340 based on the quality of the connection between the user device 310 and the remote server 320. Therefore, the quality of the connection between the user device 310 and the remote server 320 may be monitored over time, and periodically checked.

The quality of the connection, such as latency information between the user device 310 and the remote server 320 may be determined, along with the connection status of a connection between the user device 310 and the remote server 320 to indicate whether to transmit the indication 560 to the provisioning server 340. The connection status may be based on a record of historical transmissions between the user device 310 and the remote server 320, which may be indicative of the quality of the connection. For example, where the historical transmissions indicate that the user device 310 regularly disconnects from the remote server 320, the remote server 320 may send indications 560 to the provisioning server 340 more regularly to ensure that all data is correctly forwarded to the provisioning server 340 for analysis. It will be appreciated that other characteristics and/or factors associated with the connection may be used when determining the quality of the connection.

Determining Whether a User Viewed Given Impression Content

As described above, the indication 560 sent from the remote server 320 to the provisioning server 340 comprises at least data indicating that the new impression content in a new frame of remotely-rendered content was received by a user device 310. However, just because the impression content was received by a user device 310 does not necessarily mean that the impression content was viewed by a user of that user device 310. For example, where the remotely-rendered content comprises three-dimensional gaming content, the impression content may be inserted at a location in that three-dimensional environment which is out of view of the user—that is whilst it has been transmitted to the user device, if a view shown on the display of the user device 310 does not show that location, then the user will not have viewed the impression content. This is useful for the third-party partners who provide the impression content, as the advertising revenue model may need to ensure that any views of the impression content are accurately recorded, not just the receipt of the impression content at a user device 310.

As such, the indication 560 sent from the remote server 320 to the provisioning server 340 may comprise additional data such as a viewability characteristic associated with at least one of the frames of remotely-rendered content. In some examples, a separate indication may be sent from the remote server to the provisioning server 340 comprising only the viewability information, this indication may be sent periodically, at the same time or within the same time period as the indication 560 of receipt of the impression content. The viewability characteristic may be determined based on several different pieces of viewability information and the connection between the user device 310 and the remote server 320. This viewability information may be obtained by the input module 510 of the remote server 320 as a separate data package received at substantially the same time as the received frame information 550, or as part of the received frame information 550 itself. In some examples, the remote server 320 may handle receipt of the received frame information 550 and the viewability information separately. Determination of the viewability characteristic based on the viewability information may be undertaken by the determination module 520, or an additional viewability determination module 520v.

The viewability information may include the amount of time across numerous frames of remotely-rendered content that the impression content was visible, and the size of a portion of the impression content which was visible on the display of the user device 310. In some examples, the viewability information may be combined with the user device information, such as to provide the size of the display of the user device 310. Where the remotely-rendered content comprises three-dimensional gaming content, impression content visible on the display of the user device 310 may be determined based on a view representative of the perspective of a virtual camera positioned within the three-dimensional gaming content. In other examples, the quality of the transmission 320c of the remotely-rendered content from the remote server 320 to the user device 310 can be considered when determining the viewability characteristic. For example, if the quality of the transmission 320c is poor, such that the bit rate of the transmission between the remote server 320 and the user device 310 is below a given threshold, then the viewability characteristic can reflect that.

It will be appreciated that other viewability information may be used when determining the viewability characteristic. Furthermore, when determining the viewability characteristic, determination module 520, 520v may combine the viewability information in accordance with a predetermined metric. This enables the determination of whether the impression content was actually viewed to be dependent on the remotely-rendered content, and more particularly, the gaming content. For example, if the gaming content is a low-resolution 8-bit game then the bit-rate of the transmission between the remote server 320 and user device 310 is less important than say the size of a portion of the impression content visible on the display of the user device 310. Similarly, if the gaming content is a high-resolution three-dimensional game, then the size of a portion of the impression content visible on the display of the user device 310 may be more important to ensure that the impression content is positioned and displayed large enough within the three-dimensional environment for a user to be able to see it on the display.

When combined, these different factors can be used to determine the viewability characteristic, and when compared to a predetermined threshold, if the viewability characteristic falls below that threshold then it may be determined that the impression content was not successfully viewed by the user. For example, if the bit rate is so low that the impression content is pixelated or blurred on the display of the user device 310, then this may be considered as not being viewed by the user.

Between the receipt of different frames of the remotely-rendered content at the user device, the viewability information may change. For example, the viewing angle associated with a view from the perspective of a virtual camera within the three-dimensional gaming content may change based on the movements of a user's playable character in the gaming content. This change in the viewability information may be stored at the remote server 320 and transmitted as part of the indication to the provisioning server 340. One such example includes where a user is playing a game on the user device and indicates that the playable character is to move such that it is looking in the direction of the impression content. In such a case the next frame of remotely-rendered content rendered by the remote server 320 will comprise the impression content since the viewing angle of the virtual means that the impression content is visible within the field of view of the playable character. The viewing information stored at the remote server 320 will therefore have changed. This change may be stored and transmitted as part of the indication sent to the provisioning server 340. Similarly, at a later time, the user may move the playable character such that they are no longer viewing the impression content. In this case. the next frame of remotely-rendered content will not comprise the impression content since the viewing angle of the virtual camera means that the impression content is not visible within the field of view of the playable character. Again, this change in the viewability information may be stored at the remote server 320 and transmitted as part of the indication sent to the provisioning server 340.

Reliable Event Data Delivery

As described above, the user device 310 may be a mobile device such as a mobile telephone or laptop computing device and as such, the network connection between the user device and the remote server cannot be guaranteed, and/or maybe less reliable than the connection between the remote server 320 and provisioning server 340. This is because the remote server 320 and provisioning server 340 will often be connected via a wired network connection as opposed to a wireless connection, such as cellular connectivity (LTE, 3G, 4G, or 5G), or a Wi-Fi network, used by the user device 310 to communicate with the remote server 320. Furthermore, a user of a user device 310 is able to disconnect the user device 310 from the remote server 320, and/or stop the transmission of events to the remote server 320 with little to no notice, such as by pausing and/or quitting the game or other application, or disconnecting from the network connection.

Figure 6:
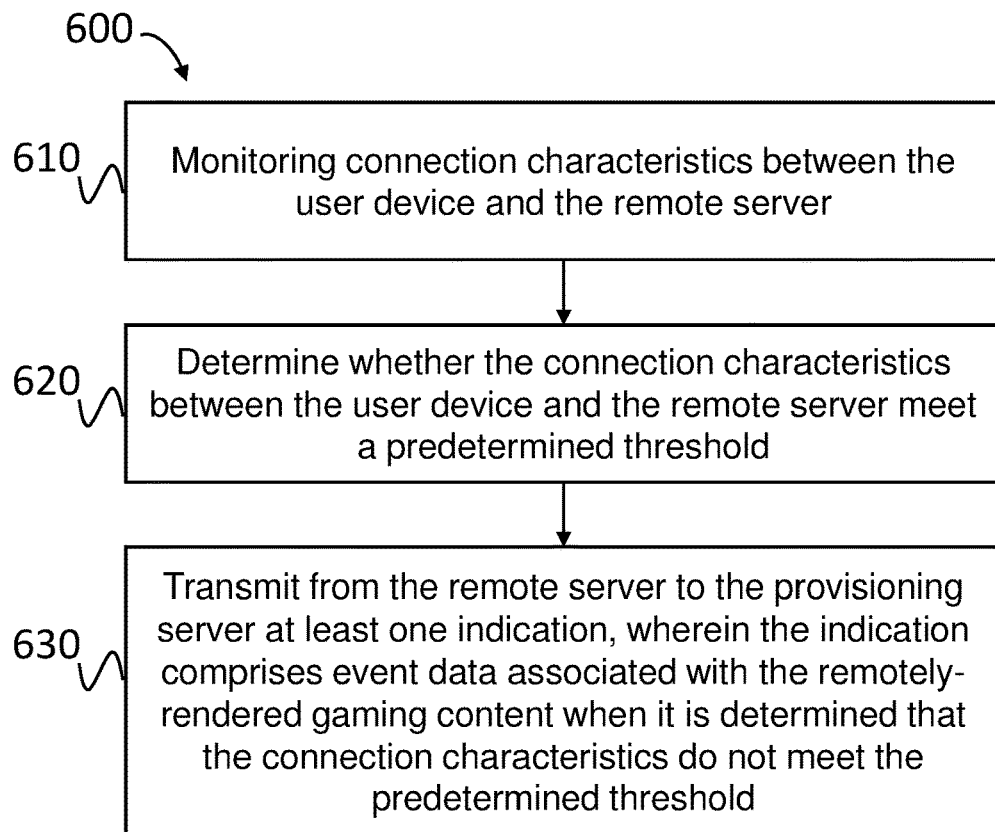
FIG. 6 shows a flowchart for a method of ensuring reliable event data delivery to a provisioning server according to an example.
Figure 7:
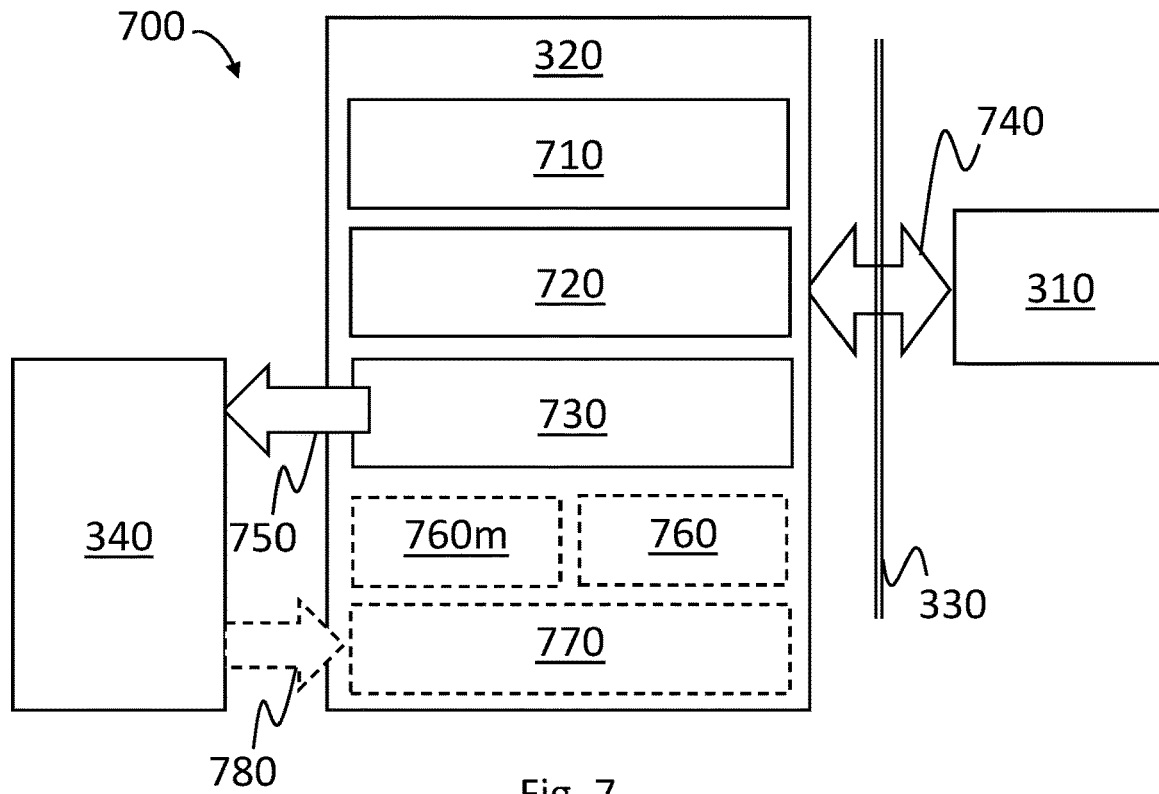
FIG. 7 is a schematic representation of a system for performing the method of FIG. 6.

It is desirable to capture event data associated with the remotely-rendered content, including but not limited to the receipt of impression content, viewability characteristics, and performance data described above, in a timely and efficient manner. FIG. 6 shows a flowchart for a method 600 for reliable event data delivery to a provisioning server 340 according to an example, and FIG. 7 shows a corresponding system 700.

At step 610, the characteristics of a connection 740 between a user device 310 and the remote server 320 are monitored. This may be undertaken by a monitoring module 710 of the remote server 320. The characteristics of the connection 740 include at least a quality metric representative of the transmission of the remotely-rendered content from the remote server 320 to the user device 310. The characteristics may include the latency of the connection 740, bandwidth, and any other relevant metrics, which indicate the quality of a connection.

In some examples, the connection characteristics may be monitored over a given time period and the quality of the transmission of data between the remote server 320 and the user device 310 based upon the changes in the characteristics over that given time period. This may be undertaken by the monitoring module 710, and or another module such as an analysis module (not shown) of the remote server 320.

Based on the monitored connection characteristics, at step 620, it is determined whether the connection characteristics of the connection 740 between the user device 310 and remote server 320, using the API 330, meet a predetermined threshold. For example, this can be used to determine whether the connection quality of the connection 740 between the user device 310 and the remote server 320 has degraded and/or is degrading over a given time period. This may be undertaken by a determination module 720 of the remote server 320. The predetermined threshold may be based on several factors and may be adjusted based on the analysis of the connection characteristics monitored over a given time period. The predetermined threshold may be based on a desired connection quality which is determined based on the monitored connection characteristics, for example, a given bandwidth, and latency. It will be appreciated that other metrics may be used to specify the predetermined threshold.

When it is determined that the characteristics of the connection 740 indicate a drop in the quality of the connection 740, the remote server 320 transmits an indication 750 comprising at least the event data associated with the remotely-rendered content to the provisioning server 340. As explained above, the event data may comprise indications representative of the receipt of a frame of the remotely-rendered content, viewability characteristics, and performance data in accordance with the examples previously described. This enables event data, and preferably all event data associated with the remotely-rendered content transmitted to the user device 310, to be flushed from the remote server 320 when the connection characteristics indicate a degradation in the quality of the connection between the user device 310 and remote server 320. By flushing the event data 750, it is ensured that the provisioning server 340 has the most up-to-date event data in the event of a disconnection between the user device 310 and the remote server 320, which would result in the subsequent disconnection between the provisioning server 340 and an instance of a program of the remote server 320 (such as a game operating in a virtual machine of a cloud environment of the remote server 320) that was being accessed by the user device This will also ensure resources at the remote server are made available for other processing tasks.

In some examples, the remote server 320 may have associated storage 760 for storing the event data associated with the remotely-rendered content alongside other data, such as the received frame information described above with reference to FIGS. 4 and 5. This event data may then be combined with the other data or other event data associated with other remotely-rendered content comprising the same impression content, and transmitted to the provisioning server 340 as part of the indication 750. The storage 760 may be a solid-state drive (SSD) or other semiconductor-based RAM; a magnetic recording medium, for example, a floppy disk or hard disk; optical memory devices in general, although it will be appreciated that other storage mediums may be used. Whilst the storage 760 is shown to be part of the remote server 320 itself, it will be appreciated that the storage 760 may be storage that is remote to the remote server 320 and accessed by the remote server 320 over a network connection.

When the event data is stored in the storage 760 associated with the remote server 320, it is desirable to efficiently manage the use of that storage 760, not only for event data, but also other data required for the remote server 320, such as for generating the remotely-rendered content, and/or storing other media assets. Therefore, following the transmission of the indication 750 comprising the event data to the provisioning server, the event data may be deleted from the storage 760. The efficient management of the storage 760 may be undertaken by a storage management module 760m. The storage management module 760m may be arranged to delete the event data from the storage 760 immediately, or shortly after, the transmission of the indication 750 to the provisioning server 340. In some examples, it may be desirable to ensure the delivery of the indication 750 to the provisioning server 340 has been successfully completed prior to deletion. In such examples, the provisioning server 340 may send an acknowledgement/confirmation message 780 to the remote server 320. The confirmation message 780 may be received by an input module 770. Upon receipt of the confirmation message 780 at the remote server 320, the storage management module 760m may delete the event data from the storage 760.

In addition to detecting whether the connection characteristics indicate the quality of a connection 740 has degraded, in some examples, the indication 750 may be transmitted to the provisioning server 340 when the capacity of the storage 760 for the event data exceeds a predetermined capacity threshold. In such an example, the available capacity of the storage 760 associated with the remote server 320 may be monitored by the storage management module 760m, and the determination module 720 may determine when the available capacity of the storage 760 is below a given capacity threshold. When it is determined that the capacity of the storage 760 is below the capacity threshold, the indication 750 may be transmitted to the provisioning server 320. Following the transmission of the indication 750 to the provisioning server 320, the event data may be deleted from the storage 760. As described above, this may be undertaken immediately or shortly after the transmission of the indication 750, or in some examples, the deletion may occur upon receipt of an acknowledgement/confirmation message 780 sent by the provisioning server 340 and received by the remote server 320.

In some examples, determining whether the connection characteristics meet the predetermined threshold may comprise monitoring the frequency of transmissions of the event data between the remote server 320 and the provisioning server 340. This may also include calculating a time since the last transmission to the provisioning server 340 based on the time of transmission of data most recently received from the user device 310. If the time between the last transmission to the provisioning server 340 and the time of the last transmission received from the user device 310 exceeds a predetermined time threshold, then this may be used to indicate that the indication 750 should be transmitted to the provisioning server 340 as it may not be desirable to store large amounts of event data at the remote server 320. In such an example, the predetermined time threshold may be proportional to the capacity of storage 760 associated with the remote server 320, such that the smaller the capacity of the storage 760, the shorter the predetermined time threshold. This helps to maintain sufficient storage capacity 760 for future event data.

Remote Server Caching

As described above, the remote server 320 may operate a cloud computing environment that comprises a plurality of isolated network segments, such as virtual machines, which enables the remote server to handle a plurality of requests for different, or the same, in the case of multiplayer gaming content, instances of remotely-rendered content. In some examples, the same impression content forming part of the remotely-rendered content may, therefore, be used in multiple instances of the remotely-rendered content. In such examples, multiple requests may be made from the remote server 320 to the provisioning server 340 requesting the same media assets, such as image data, video data, audio data and/or text. Multiple requests sent from the remote server 320 to the provisioning server 340 results in increased bandwidth requirements and, once received by the remote server 320, storage of what is essentially the same media asset(s), more than once.

Figure 8:
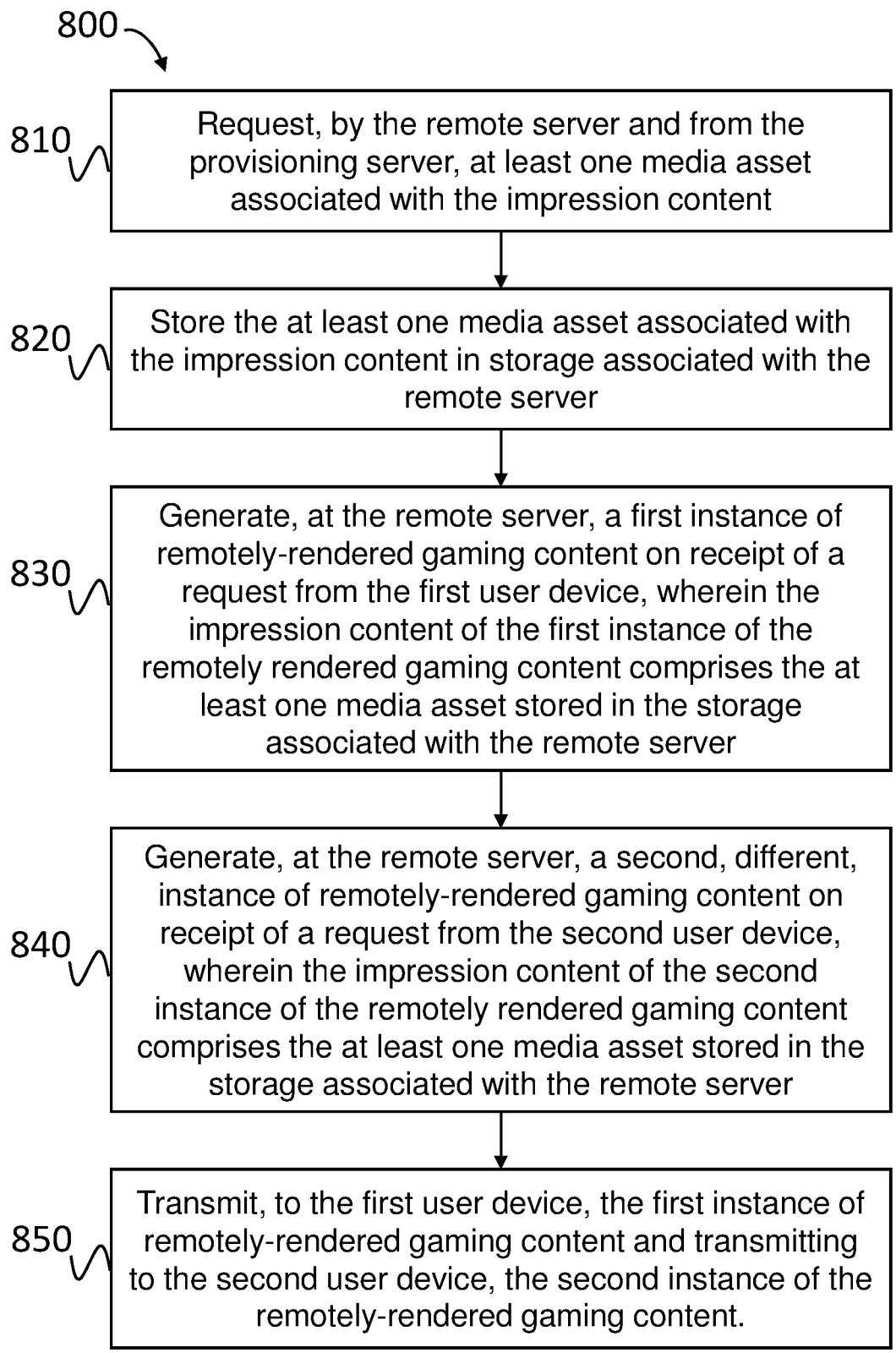
FIG. 8 shows a flowchart for a method of remote server caching according to an example.
Figure 9:
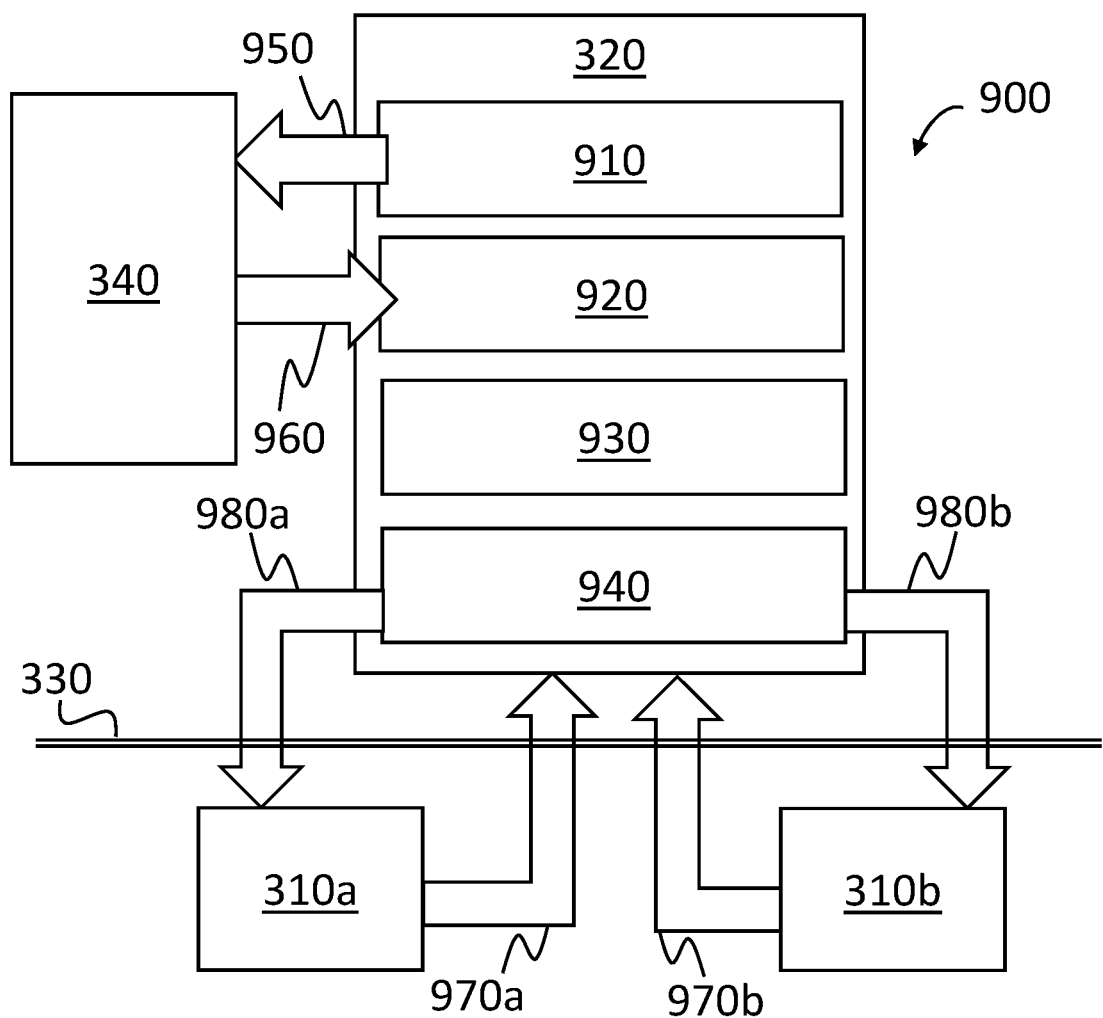
FIG. 9 is a schematic representation of a system for performing the method of FIG. 8.

Accordingly, to improve resource usage relating to impression content, and the associated media assets, it is desirable to cache at least some of the media assets at the remote server 320. FIG. 8 shows a flowchart for a method 800 remote server caching according to an example, and FIG. 9 shows a corresponding system 900.

At step 810, the remote server 320 requests 950 at least one media asset associated with the impression content, from the provisioning server 340. The request 950 may be undertaken by a request module 910 of the remote server 320. The request 950 may be initialised because the remote server 320 is generating multiple instances of remotely-rendered content, each having the same impression content.

In some examples, the framework 350 described above with reference to FIG. 2 may comprise a plurality of provisioning servers 340, and the request 950 from the remote server 320 may be sent to at least one of the provisioning servers 340 based on proximity of the provisioning server 340 to the requesting remote server 320. The proximity may be based on several different factors including the geographical location of the remote server 320 and the provisioning servers 340 and/or a response time of a transmission between the remote server 320 and each of the plurality of provisioning server 340. This enables provisioning servers 340 to be selected based on the proximity to the remote server 320 such that any assets are downloaded to the remote server 320 more efficiently, that is the provisioning server 340 that will provide the most timely response; and that such assets are geographically relevant to the user devices 310a, 310b requesting remotely-rendered content from the remote server 320.

At step 820, the media asset 960 associated with the impression content is received by the remote server 320 and is stored in storage 920. The storage 920 may be a solid-state drive (SSD) or other semiconductor-based RAM; a magnetic recording medium, for example, a floppy disk or hard disk; optical memory devices in general, although it will be appreciated that other storage mediums may be used. Whilst the storage 920 is shown to be part of the remote server 320 itself, it will be appreciated that the storage 920 may be storage that is remote to the remote server 320 and accessed by the remote server 320 over a network connection. The connection between the remote server 320 and the storage 920 may be faster than the connection between the provisioning server 340 and the remote server 320, which will result in faster access to the media assets 960 stored thereon.

In some examples, selection of the at least one media asset 960 by the provisioning server 340 may be based on one or more factors. These factors may include information associated with a given campaign, and/or data provided by the user devices 310*a*, 310*b* to the remote server 320 which may make up part of the request 950. For example, a particular campaign may have a given active period during which it is to be shown, and therefore any requests for media assets during that active period may be based on that active period. Other factors may include the location of a given user device 310*a*, 310*b*.

Similarly, the one or more media assets 960 provided by the provisioning server 340 may be based on one or more predetermined filters. These filters may include characteristics of the first 310*a* and/or second 310*b* user devices arranged to receive the remotely-rendered content. These characteristics may have been provided by the respective user device 310*a*, 310*b* as described above with reference to FIG. 2, and may include the operating system of the user device 310*a*, 310*b*, hardware characteristics of the user device 310*a*, 310*b* such as processor type and/or capabilities, a unique identifier associated with the user device 310*a*, 310*b* which may include an internet protocol address, and a geographic location obtained from the user device 310*a*, 310*b*.

In addition to characteristics associated with the user device 310*a*, 310*b*, the filters may comprise other characteristics such as a rating associated with the remotely-rendered content, and a date and/or time associated with the initialisation of the impression content, such as an advertising campaign start date. These predetermined filters enable media assets 960 to be requested and/or provided by the provisioning server 340 to be tailored and customized. For example, the media assets 960 may be age-restricted based on the remotely-rendered content, that is it would be inappropriate to provide certain media assets for inclusion in remotely-rendered content which comprises gaming content for a children's game. Similarly, the filters enable the media assets 960 to be tailored based on the location of a user device 310*a*, 310*b* arranged to receive the remotely-rendered content. For example, it may be inefficient to cache a media asset in Chinese to a remote server 320 which only serves user devices 310*a*, 310*b* located within the United States.

In other examples, the media asset 960 associated with the impression content for use in the generation of the remotely-rendered content may be based on impression content previously transmitted from the remote server 320 to at least one of the first user device 310*a* or second user device 310*b*. This enables the provisioning of media assets to be based on the previous impression content delivered to the user devices, thereby enabling similarity and/or continuity between the impression content. One such example, where the impression content is an advertisement, where a media asset associated with a particular brand has been used in impression content provided to a given user device, future impression content may also include media assets associated with that particular brand.

Returning to method 800, upon receipt and storage of the media asset 960 associated with the impression content, at step 830, a request 970*a* is received from a first user device 310*a* to the remote server 320 for a first instance 980*a* of the remotely-rendered content generated by the remote server 320. The first instance 980*a* of the remotely-rendered content comprises impression content generated by the provisioning server 340, whereby the impression content comprises the media asset 960 stored in the storage 920 of the remote server 320. The first instance 980*a* of the remotely-rendered content is generated at the remote server 320 by a generation module 930.

Similarly, at step 840, a request 970*b* is received from a second user device 310*b* to the remote server 320 for a second, different, instance 980*b* of the remotely-rendered content generated by the remote server 320. The second instance 980*b* of the remotely-rendered content also comprises the same impression content generated by the provisioning server 340, and as such, the impression content comprises the media asset 960 stored in the storage 920 of the remote server 320. The second instance 980*b* of the remotely-rendered content may also be generated at the remote server 320 by a generation module 930.

Since both the first instance 980*a* of the remotely-rendered content and the second instance 980*b* of the remotely-rendered content comprise the same impression content which in turn comprises the same media assets 960 stored in the storage 920 of the remote server 320, efficiencies can be gained as multiple requests for the same media asset 960 are no longer required. The impression content can be generated using the media asset 960 stored in the storage 920 when the remote server 320 generates the instances 980*a*, 980*b* of the remotely-rendered content.

Following the generation of the first instance 980*a* and second instance 980*b* of the remotely-rendered content, at step 850, the first instance 980*a* and second instance 980*b* are transmitted to the first user device 310*a* and second user device 310*b* respectively. This transmission may be undertaken by a transmission module 940 associated with the remote server. As with other examples described above, the first instance 980*a* and the second instance 980*b* may be transmitted using an API 330 which is configured to handle communication between the remote server 320 and the user devices 310*a*, 310*b*. Whilst the steps 810, 820, 830, 840, 850 have been described as sequential, it will be appreciated that at least some of the steps 810, 820, 830, 840, 850 may be undertaken in parallel and in any order. For example, steps 830 and 840, where the first instance 980*a* and second instance 980*b* of remotely-rendered content are generated, these may be generated in parallel, rather than sequentially as described above.

At least some aspects of the embodiments described herein with reference to FIGS. 1-9 comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

It is to be understood that although the disclosure above relates to the use of cloud computing, the implementation described is not limited to a cloud computing environment.

Rather, embodiments of the present disclosure are capable of being implemented in conjunction with any other type of computing environment.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A server-side gaming method performed by a framework for delivering remotely-rendered content comprising impression content to at least a first user device and a second user device, the framework comprising:
    a provisioning server arranged to generate and manage the impression content;
    a remote server arranged to generate a plurality of frames of the remotely-rendered content, wherein the plurality of frames of remotely-rendered content comprises gaming content and the impression content; and
    an application programming interface, API, for sending and receiving data between the first user device and the remote server, and the second user device and remote server,
    the method comprising:
        requesting, by the remote server and from the provisioning server, at least one media asset associated with the impression content;
        storing the at least one media asset associated with the impression content in storage associated with the remote server;
        on receipt of a request from the first user device to the remote server using the API, generating, at the remote server, a first instance of remotely-rendered content, wherein the impression content of the first instance of remotely rendered content comprises the at least one media asset stored in the storage associated with the remote server;
        on receipt of a request from the second user device to the remote server using the API, generating at the remote server, a second, different, instance of remotely-rendered content, wherein the impression content of the second instance of remotely-rendered content comprises the at least one media asset stored in the storage associated with the remote server; and
        transmitting, to the first user device, the first instance of remotely-rendered content and transmitting to the second user device, the second instance of the remotely-rendered content.

2. The server-side gaming method according to claim 1, wherein the request, sent by the remote server to the provisioning server, for at least one media asset associated with the impression content is based on an active period associated with the impression content.

3. The server-side gaming method according to claim 2, wherein the active period associated with the impression content is based on a time period during which the impression content is transmitted from the provisioning server to the remote server for generating the remotely-rendered content.

4. The server-side gaming method according to claim 1, wherein the at least one media asset associated with the impression content is based on one or more predetermined filters.

5. The server-side gaming method according to claim 4, wherein the one or more predetermined filters are based on at least one of:
    characteristics of the first user device or second user device arranged to receive the remotely-rendered content;
    a rating associated with the remotely-rendered content; and
    an initialisation date associated with the impression content.

6. The server-side gaming method according to claim 5, wherein the characteristics of the first user device and second user device comprise at least:
    an operating system;
    hardware characteristics;
    an internet-protocol or other unique identifier; and
    a geographical location.

7. The server-side gaming method according to claim 1, wherein the at least one media asset associated with the impression content is based on a similarity to impression content previously transmitted to at least one of the first user device or second user device.

8. The server-side gaming method according to claim 1, wherein the framework comprises a plurality of provisioning servers, and wherein the request for at least one media asset associated with the impression content is sent by the remote server to at least one of the plurality of provisioning servers, wherein the at least one provisioning server is selected based on a proximity of the at least one provisioning server to the remote server.

9. The server-side gaming method according to claim 8, wherein the proximity of the at least one provisioning server to the remote server is based on at least one of:
    a geographical location of the at least one provisioning server;
    a geographical location of the remote server; and
    a response time of a transmission between the remote server and the at least one provisioning server.

10. The server-side gaming method according to claim 1, wherein the remotely-rendered content is generated in an isolated network segment associated with the remote server.

11. A system for delivering remotely-rendered content comprising impression content to at least a first user device and a second user device, the system comprising:
    a provisioning server arranged to generate and manage impression content;
    a remote server arranged to generate a plurality of frames of remotely-rendered content, wherein the plurality of frames of remotely rendered gaming content comprises gaming content and the impression content;
    a first user device arranged to receive the remotely-rendered content;
    a second user device arranged to receive the remotely-rendered content; and
    an application programming interface, API, for sending and receiving data between the first and second user devices and the remote server, wherein the remote server comprises:
- a request module for requesting, by the remote server and from the provisioning server, at least one media asset associated with the impression content;
- storage for storing the at least one media asset associated with the impression content in storage associated with the remote server;
- a generation module for generating at least:
  - a first instance of remotely-rendered content, wherein the impression content of the first instance of the remotely rendered gaming content comprises the at least one media asset stored in the storage associated with the remote server on receipt of a request from the first user device to the remote server using the API; and
  - a second, different, instance of remotely-rendered content, wherein the impression content of the second instance of the remotely-rendered content comprises the at least one media asset stored in the storage associated with the remote server on receipt of a request from the second user device to the remote server using the API; and
- a transmission module for transmitting, to the first user device, the first instance of remotely-rendered content, and transmitting, to the second user device, the second instance of the remotely-rendered content.

12. The system for delivering remotely-rendered content according to claim 11, wherein the system comprises a plurality of provisioning servers, and wherein the request, by the remote server, is sent to at least one of the plurality of provisioning servers, the at least one provisioning server being selected based on a proximity of the at least one provisioning server to the remote server.

13. A non-transitory computer-readable storage medium comprising a set of computer-readable instructions stored thereon which, when executed by at least one processor are arranged to deliver remotely-rendered content comprising impression content to at least a first user device and second user device using a framework, the framework comprising:

- a provisioning server arranged to generate and manage the impression content;
- a remote server arranged to generate a plurality of frames of the remotely-rendered content, wherein the plurality of frames of remotely-rendered content comprises gaming content and the impression content; and
- an application programming interface, API, for sending and receiving data between the first user device and the remote server, and the second user device and remote server, wherein the instructions, when executed, cause the processor to:
- request, by the remote server and from the provisioning server, at least one media asset associated with the impression content;
- store the at least one media asset associated with the impression content in storage associated with the remote server;
- generate, at the remote server and on receipt of a request from the first user device to the remote server using the API, a first instance of remotely-rendered content, wherein the impression content of the first instance of remotely rendered content comprises the at least one media asset stored in the storage associated with the remote server;
- generate, at the remote server and on receipt of a request from the second user device to the remote server using the API, a second, different, instance of remotely-rendered content, wherein the impression content of the second instance of remotely rendered content comprises the at least one media asset stored in the storage associated with the remote server; and
- transmit, to the first user device, the first instance of remotely-rendered content, and transmit, to the second user device, the second instance of remotely-rendered content.

* * * * *